US006490789B1

(12) United States Patent
Ide

(10) Patent No.: US 6,490,789 B1
(45) Date of Patent: Dec. 10, 2002

(54) CONNECTING STRUCTURE FOR COVERED WIRES

(75) Inventor: Tetsuro Ide, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/525,450

(22) Filed: Mar. 14, 2000

Related U.S. Application Data

(62) Division of application No. 09/260,541, filed on Mar. 2, 1999.

(30) Foreign Application Priority Data

Mar. 3, 1998 (JP) ............................................ 10-50955

(51) Int. Cl.[7] ............................................ A01R 43/00

(52) U.S. Cl. ......................... 29/872; 29/868; 174/84 R; 174/85

(58) Field of Search .......................... 29/872, 825, 826; 174/84 R, 85

(56) References Cited

U.S. PATENT DOCUMENTS

| | | | | |
|---|---|---|---|---|
| 807,747 | A | | 12/1905 | Kling |
| 3,519,731 | A | | 7/1970 | Grunbaum |
| 5,122,068 | A | | 6/1992 | Koss |
| 5,584,122 | A | | 12/1996 | Kato et al. |
| 5,869,784 | A | | 2/1999 | Shinchi |
| 5,906,044 | A | * | 5/1999 | Fujii et al. |
| 5,922,993 | A | | 7/1999 | Ide et al. |
| 5,925,202 | A | | 7/1999 | Ide et al. |
| 5,929,384 | A | | 7/1999 | Ide et al. |
| 5,959,252 | A | * | 9/1999 | Ide et al. |
| 6,004,170 | A | * | 12/1999 | Kato et al. |
| 6,046,407 | A | * | 4/2000 | Ide |
| 6,072,123 | A | * | 6/2000 | Ide et al. |
| 6,072,124 | A | * | 6/2000 | Kato et al. |
| 6,087,589 | A | * | 7/2000 | Ide |
| 6,201,188 | B1 | * | 3/2001 | Ide |

FOREIGN PATENT DOCUMENTS

| | | |
|---|---|---|
| EP | 838 883 A2 | 4/1998 |
| JP | 7-320842 | 12/1995 |

* cited by examiner

*Primary Examiner*—Carl J. Arbes

(74) *Attorney, Agent, or Firm*—Finnegan, Henderson, Farabow, Garrett, & Dunner, L.L.P.

(57) ABSTRACT

A connecting structure for covered wires is provided. At first, a shield wire 1 and a ground wire 2 are prepared. After overlaying the ground wire 2 on the shield wire 1 cross each other, respective overlapping portions of the wires 1, 2 are interposed between an upper resin tip 13 and a lower resin tip 14. Next, the upper and lower resin tips 13, 14 are oscillated with ultrasonic waves while compressing the upper and lower resin tips 13, 14 from the outside. Consequently, respective outside rinds 1*d*, 2*b* of the wires 1, 2 are molten for removal, so that a braided wire 1*c* comes into electrical contact with a core line 2*a*. The upper and lower resin tips 13, 14 have wire receiving grooves 13*a*, 14*a* formed on their butt faces. Each of the groove 13*a*, 14*a* has a semi-circular cross section of a diameter corresponding to the diameter of the shield wire 1. The upper resin tip 13 is provided, at an intermediate portion of the wire receiving groove 13*a* in the longitudinal direction, with a press part 13*b* for urging the ground wire 2 against the shield wire 1.

5 Claims, 6 Drawing Sheets

CONNECTING STRUCTURE FOR COVERED WIRES

This is a division of application Ser. No. 09/260,541, filed Mar. 19, 1999, the entire disclosure of which is incorporated herein by reference.

BACKGROUND OF THE INVENTION

1. Field of the Invention

The present invention relates to a connecting structure for covered wires where their respective conductors are connected to each other by oscillating respective insulating covers of the wires with ultrasonic waves. More particularly, it relates to a connecting structure which is effective to connect a shield wire with a ground wire.

2. Description of the Related Art

Generally speaking, it is complicated and troublesome to handle a shield wire having a braided wire coaxially disposed around a core line (or core lines) with the deteriorated workability in using the shield wire. As an effective measure for improving the deteriorated workability, there is provided a connecting structure for wires which takes advantage of inside heating due to the ultrasonic oscillation by Japanese Unexamined Patent Publication (kokai) No. 7-320842.

In the publication, there are shown two kinds of covered wires. One is a shield wire which comprises a core line, an inside insulating rind arranged outside the core line, a braided wire as a shield conductor arranged outside the inside insulating rind, and an outside insulating rind. The other is a ground wire consisting of a core line and an outside resinous rind arranged outside the core line.

According to the disclosed method of connecting the braided wire of the shield wire being connected to a connector, to the core line of the ground wire being also connected to the connector, in front of the connector, the ground wire is firstly overlaid on the shield wire so as to cross each other at a connection point. Next, the overlapping portions are interposed between upper and lower resin tips. Then, while compressing the upper and lower resin tips from the outside, they are subjected to ultrasonic oscillation by making use of an ultrasonic horn and an anvil. Consequently, both of the outside rinds of the shield wire and the ground wire are molten for elimination, so that the braided wire of the shield wire comes into electrical contact with the core line of the ground wire. Simultaneously, the upper and lower resin tips are mutually welded to each other thereby to seal up the surroundings of the above connecting point. Note, in the modification, there is a case that the upper and lower resin tips are respectively provided, on bearing faces thereof, with wire-accommodating shallow grooves for positioning the shield wire.

In the above-mentioned connecting structure, however, there is sometimes observed a phenomenon that, when welding the upper and lower resin tips to each other, the outside insulating rind of the shield wire is disadvantageously torn or broken in the vicinity of a point where the periphery of the upper resin tip abuts on the shield wire, so that the braided wire of the shield wire is exposed outside the integrated tips. In such a case, the exposure of the braided wire causes the fixing force between the integrated resin tips and the shield wire, i.e. the strength of connection, to be reduced, also lowering the insulating effect brought by the integrated tips.

SUMMARY OF THE INVENTION

Under such a circumstance, it is therefore an object of the present invention to provide a connecting structure for covered wires, which is capable of improving the strength in connection and the insulating effect.

The object of the present invention described above can be accomplished by a connecting structure for covered wires, comprising:

a first covered wire having a first conductor covered with a first resinous cover;

a second covered wire having a second conductor covered with a second resinous cover, the second conductor being electrically connected with the first conductor of the first covered wire cross each other; and an upper resin tip and a lower resin tip between which an electrical connecting part of the first and second conductors and the surroundings are interposed, the upper resin tip being welded to the lower resin tip while interposing the first and second covered wires between the upper resin tip and the lower resin tip;

wherein each of the upper and lower resin tips is provided, on its butt face being abutted against the other resin tip, with a wire receiving groove which has a semi-circular cross section of a diameter corresponding to the diameter of the first covered wire.

According to the connecting structure, since the diameter of the wire receiving groove corresponds to the diameter of the first covered wire, it is possible to weld the upper resin tip to the lower resin tip in the wrapping manner without compressing the first resinous cover of the first covered wire. Thus, since there is no possibility that the first resinous cover of the first covered wire is torn or broken by the upper or lower resin tip, the fixing force between the upper and lower resin tips and the first covered wire can be enhanced. In addition, it is possible to exclude a possibility that the first covered wire exposes the first conductor in the vicinity of the upper and lower resin tips. In the above-mentioned connecting structure, preferably, the first covered wire is a shield wire, while the second wire is a ground wire and wherein the first conductor is a shield conductor of the shield wire, while the second conductor is a core line of the ground wire.

According to the above-mentioned constitution, it is possible to weld an outside rind of the shield wire in the wrapping manner, whereby the damage on the outside rind can be prevented. Thus, owing to the reduced damage on the outside rind, the fixing force between the upper and lower resin tips and the shield wire can be enhanced to stabilize the connecting strength.

In the above-mentioned connecting structure, preferably, the upper resin tip is provided, at an intermediate portion of the wire receiving groove in the longitudinal direction, with a press part which serves to urge the second covered wire against the first covered wire and of which depth is smaller than the other portion of the wire receiving groove.

According to the above-mentioned structure, owing to the provision of the press part, it is possible to compress the overlapping portions of the covered wires intensely. Thus, it is possible to accelerate the progress of melting and welding. Moreover, since the provision of the press part allows the resultant connecting structure to restrict a portion where the first and second resinous covers are to be removed by the ultrasonic oscillation, it is possible to accomplish the stable electrical connection between the covered wires, thereby improving the reliability of electrical connection. Further, owing to the concentration of ultrasonic waves on the press part, it is possible to reduce the welding energy itself.

In the above-mentioned connecting structure, preferably, each of the upper and lower resin tips is provided, on an outer edge of the butt face, with a recess for fitting the second resinous cover of the second covered wire.

According to the above-mentioned structure, when abutting the upper resin tip against the lower resin tip, it is possible to accommodate the second resinous cover of the second covered wire in the recess in the wrapping manner. Thus, it is possible to hold the second covered wire securely and prevent the second conductor of the second covered wire from being exposed, whereby the insulating effect can be enhanced. Additionally, since the second covered wire is welded in a manner that the upper and lower resin tips envelop the leading end of the second resinous cover of the second covered wire, it is possible to enhance the waterproof capability of the second covered wire at the leading end.

In the above-mentioned connecting structure, preferably, the upper resin tip is provided, on a part of the butt face contacting the second covered wire, with a protrusion for concentrating an ultrasonic energy in oscillating the upper and lower resin tips with ultrasonic waves.

According to the above structure, owing to the provision of the protrusion, it is possible to concentrate the ultrasonic energy on a part of the second covered wire in contact with the protrusion, so that the second resinous cover of the second covered wire can be molten initially and thereafter, the butt faces of the upper and lower resin tips can be welded to each other. Thus, it is possible to weld the second covered wire to the first covered wire certainly, whereby the welding strength can be improved. Further, owing to the concentration of ultrasonic waves on the protrusion, it is possible to reduce the energy loss, thereby allowing the welding period to be reduced.

According to the present invention, there is also provided a method of producing a connecting structure for covered wires, the method comprising the steps of:

preparing a first covered wire having a first conductor covered with a first resinous cover and a second covered wire having a second conductor covered with a second resinous cover;

overlaying the second covered wire on the first covered wire cross each other;

interposing respective overlapping portions of the first and second covered wires between an upper resin tip and a lower resin tip; and oscillating the upper and lower resin tips with ultrasonic waves while compressing the upper and lower resin tips from the outside, whereby the first and second resinous covers of the first and second covered wires are molten for removal thereby to bring the first conductor of the first covered wire into electrical contact with the second conductor of the second covered and simultaneously, the upper and lower resin tips are mutually welded to each other thereby to seal up the surroundings of a contact between the first conductor and the second conductor;

wherein each of the upper and lower resin tips is provided, on its butt face being abutted against the other resin, with a wire receiving groove which has a semi-circular cross section of a diameter corresponding to the diameter of the first covered wire.

Also in the above-mentioned method, preferably, the first covered wire is a shield wire, while the second wire is a ground wire and wherein the first conductor is a shield conductor of the shield wire, while the second conductor is a core line of the ground wire.

In the above-mentioned method, preferably, the upper resin tip is provided, at an intermediate portion of the wire receiving groove in the longitudinal direction, with a press part which serves to urge the second covered wire against the first covered wire and of which depth is smaller than the other portion of the wire receiving groove.

In the above-mentioned method, preferably, each of the upper and lower resin tips is provided, on an outer edge of the butt face, with a recess for fitting the second resinous cover of the second covered wire.

In the above-mentioned method, preferably, the upper resin tip is provided, on a part of the butt face contacting the second covered wire, with a protrusion for concentrating an ultrasonic energy in oscillating the upper and lower resin tips with ultrasonic waves.

These and other objects and features of the present invention will become more fully apparent from the following description and appended claims taken in conjunction with the accompany drawings.

BRIEF DESCRIPTION OF THE DRAWINGS

FIG. 1B is a perspective view showing a lower resin tip; and FIG. 1C is a front view of the and lower resin tips putting their face together;

FIGS. 2A and 2B show the connecting structure of the first embodiment, in which FIG. 2A is a perspective view of the connecting structure and FIG. 2B is a cross sectional view of the connecting structure, taken along a line IIb—IIb of FIG. 2A;

FIGS. 3A and 3B are views showing resin tips constituting the connecting structure in accordance with the second embodiment of the present invention, in which FIG. 3A is a perspective view showing an upper resin tip turned over and FIG. 3B is a perspective view showing a lower resin tip;

FIGS. 4A and 4B show the connecting structure of the second embodiment, in which FIG. 4A is a perspective view of the connecting structure and FIG. 4B is a cross sectional view of the connecting structure, taken along a line IVb—IVb of FIG. 4A;

FIGS. 5A and 5B are views showing resin tips constituting the connecting structure in accordance with the third embodiment of the present invention, in which FIG. 5A is a perspective view showing an upper resin tip turned over and FIG. 5B is a perspective view showing a lower resin tip;

FIGS. 6A and 6B show the connecting structure of the third embodiment, in which FIG. 6A is a perspective view of the connecting structure and FIG. 6B is a cross sectional view of the connecting structure, taken along a line VIb—VIb of FIG. 6A.

DESCRIPTION OF THE PREFERRED EMBODIMENT

U.S. Pat. No. 5,584,122, Kato et al., issued on Dec. 17, 1996 is characterized by reference herein in its entirety. Embodiments of the present invention will be described with reference to the drawings.

[1$^{st}$. embodiment]

Figure 1A:
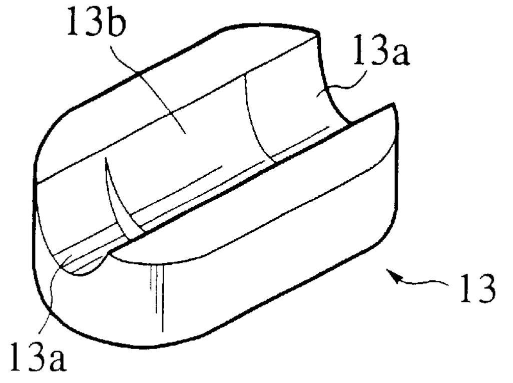
FIGS. 1A to 1C are views showing resin tips constituting a connecting structure in accordance with the first embodiment of the present invention, in which FIG. a perspective view showing an upper resin tip turned over.
Figure 1B:
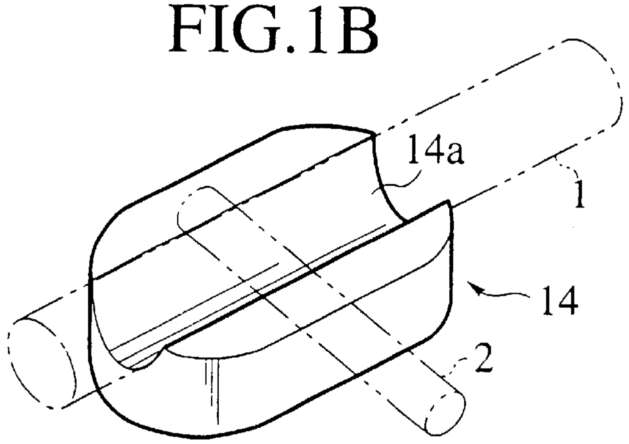
Figure 1C:
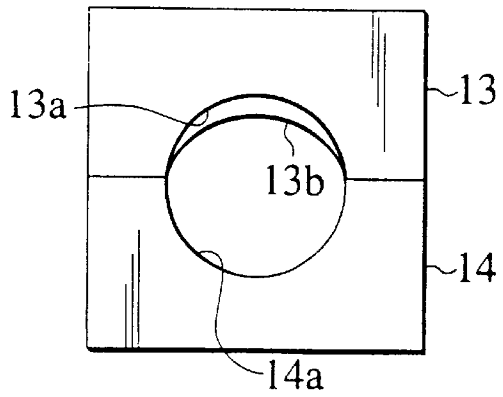

FIGS. 1A to 1C show resin tips constituting the connecting structure in accordance with the first embodiment of the present invention. FIG. 1A shows an upper resin tip 13 turned over, while FIG. 1B shows a lower resin tip 14. FIG. 1C shows the upper and lower resin tips 13, 14 putting their face together.

Each of the resin tips 13, 14 is constituted by a plate body having a profile of an elongated circle in its plan view.

Formed on respective butt faces (i.e. mutual contact faces being welded) of the upper and lower resin tips 13, 14 are wire receiving grooves 13*a*, 14*a* each of which extends along a direction of the long axis of the elongated circle and has a semicircular cross section of a diameter corresponding to a shield wire 1, in detail, a diameter equal to or somewhat larger than that of an outside rind of the shield wire. According to the embodiment, the upper resin tip 13 is provided, at an intermediate portion of the wire receiving groove 13*a* in the longitudinal direction, with a press part 13*b* which serves to urge a ground wire 2 against the shield wire 1 since the depth of the groove 13*a* is reduced locally.

Figure 2A:
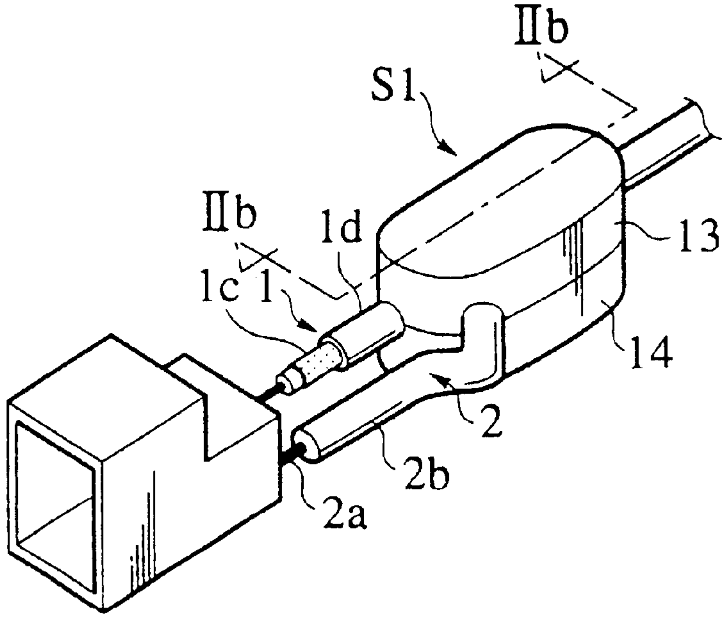

In order to connect the shield wire 1 to the ground wire 2, it is firstly overlaid on the shield wire 1 so as to cross each other at a connection point. Next, after interposing the overlapping portions of the wires 1, 2 between the upper resin tip 13 and the lower resin tip 14, the portions are subjected to ultrasonic oscillation by making use of an ultrasonic horn and an anvil (not shown) while compressing the upper and lower resin tips 13, 14 from the outside. Consequently, both of an outside rind id of the shield wire 1 and an outside rind 2*b* of the ground wire 2 are molten for elimination, so that a braided wire 1*c* of the shield wire 1 comes into electrical contact with a core line(s) 2*a* of the ground wire 2. Simultaneously, the upper and lower resin tips 13, 14 are mutually welded to each other thereby to seal up the surroundings of the above connecting point. In this way, it can be obtained a connecting structure S1 between the shield wire 1 and the ground wire 2, as shown in FIGS. 2A and 2B.

Figure 2B:
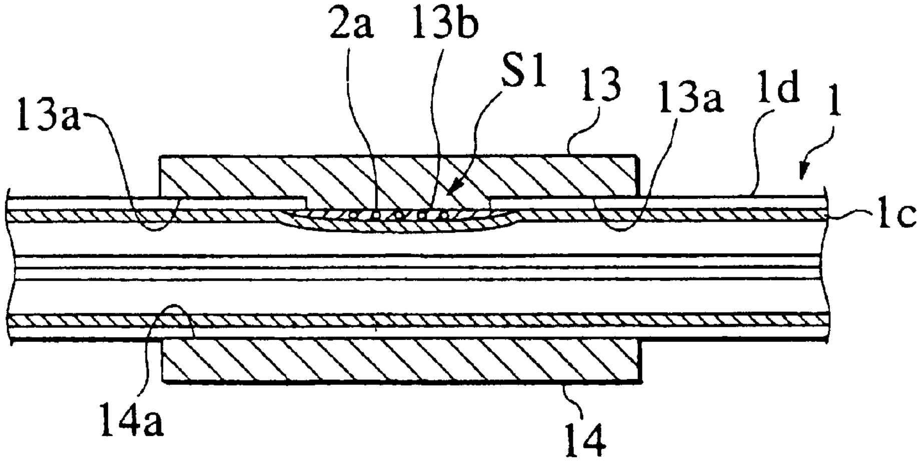

According to the resultant connecting structure S1, since the diameters of the receiving grooves 13*a*, 14*a* of the resin tips 13, 14 correspond to the diameter of the outside rind of the shield wire 1, the upper resin tip 13 is welded to the outside rind 1*d* of the shield wire 1 in the wrapping manner without compressing the rind id intensely, as shown in FIG. 2B. Thus, since there is no possibility that the outside rind id of the shield wire 1 is torn or broken by the resin tip 13, the fixing force between the resin tips 13, 14 and the shield wire 1 can be enhanced. In addition, it is possible to exclude a possibility that the shield wire 1 exposes the braided wire 1*c* in the vicinity of the resin tips 13, 14, whereby the insulating effect can be improved.

Furthermore, since the overlapping portions of the shield wire 1 and the ground wire 2 are strongly pressed on each other owing to the provision of the press part 13*b* on the upper resin tip 13, it is possible to accelerate the progress of melting and welding. Moreover, since the provision of the press part 13*b* allows the resultant connecting structure to restrict a portion where the outside rinds 1*d*, 2*b* are to be removed by the ultrasonic oscillation, the outside rinds 1*d*, 2*b* can be molten and removed collectively, thereby providing the stable electrical connection between the braided wire 1*c* of the shield wire 1 and the core line 2*a* of the ground wire 2. Further, owing to the concentration of ultrasonic waves on the press part 13*b*, it is possible to reduce the welding energy itself.

[2$^{nd}$. embodiment]

Figure 3A:
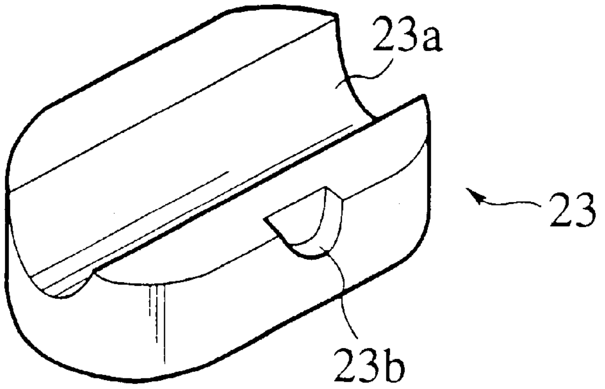
Figure 3B:
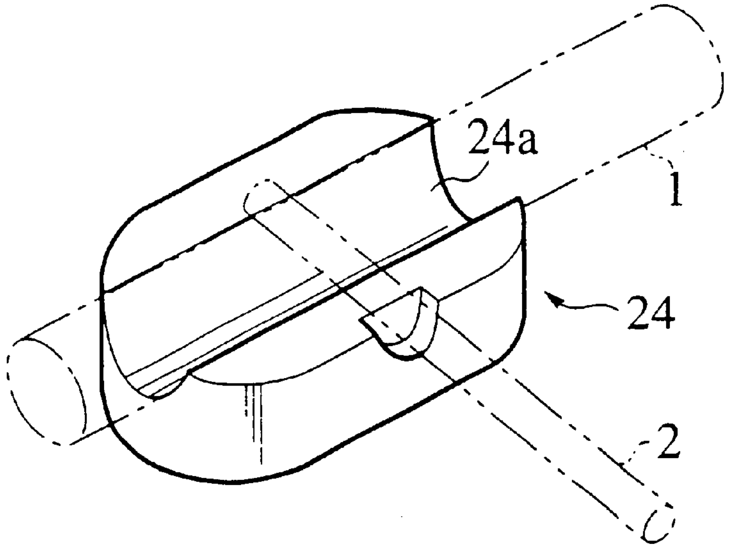

FIGS. 3A and 3B show resin tips constituting the connecting structure in accordance with the second embodiment of the present invention. FIG. 3A shows an upper resin tip 23 turned over, while FIG. 3B shows a lower resin tip 24.

The second embodiment is similar to the first embodiment in view that both of the resin tips 23, 24 are constituted by plate bodies each having a periphery of an elongated circle in its plan view and also provided, on respective butt faces thereof, with wire receiving grooves 23*a*, 24*a* each of which has a diameter corresponding to the diameter of the shield wire 1. The second embodiment differs from the first embodiment in view that both of the resin tips 23, 24 are provided, on respective outer edges of the butt faces, with recesses 23*b*, 24*b* for fitting the outside rind 2*b* of the ground wire 2, respectively. Each of the recesses 23*b*, 24*b* is formed so as not to press the outside rind 2*b* of the ground wire 2.

Figure 4A:
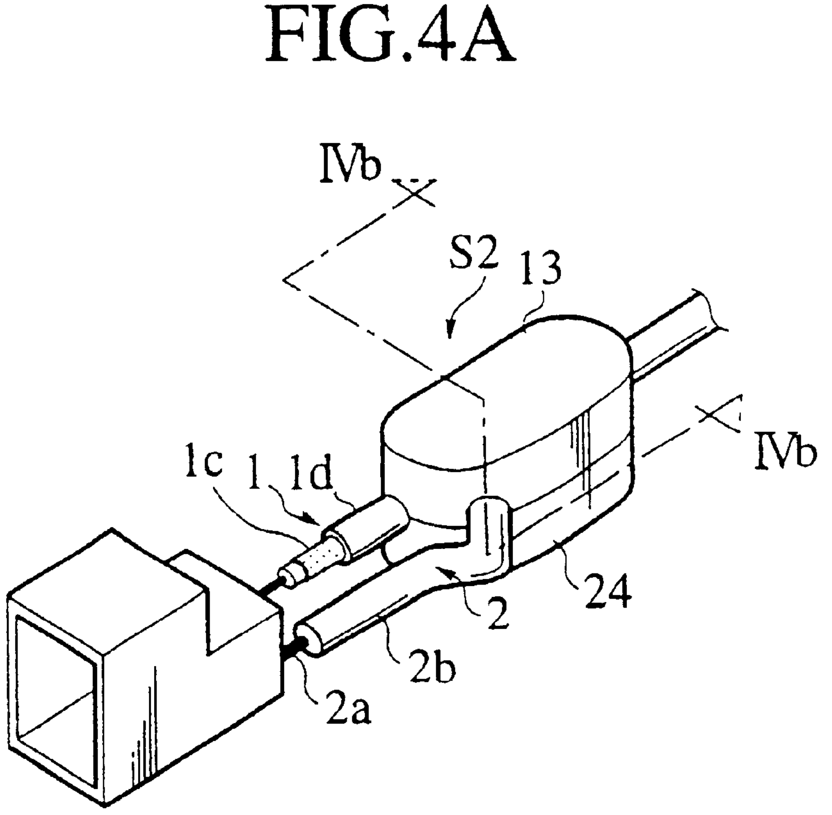
Figure 4B:
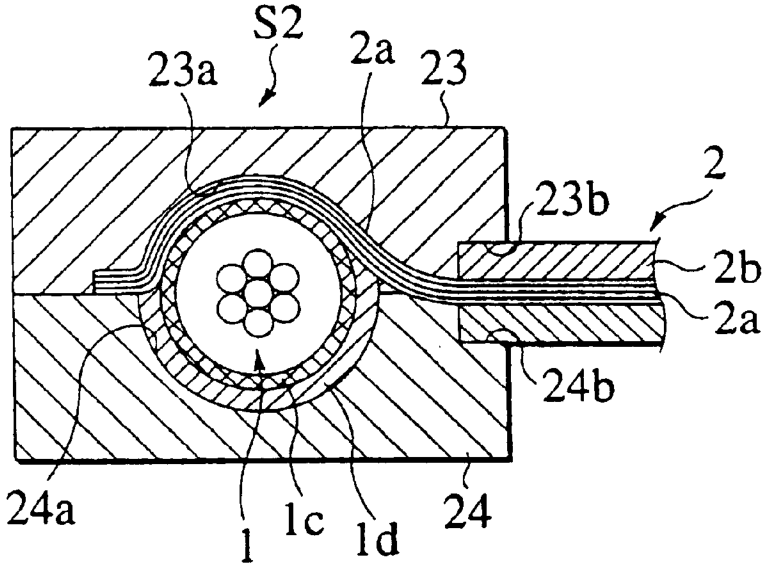

FIGS. 4A and 4B show a connecting structure S2 between the shield wire 1 and the ground wire 2, which is provided by using the abovementioned resin tips 23, 24. According to the shown structure S2, when abutting the resin tips 23, 24 on each other, it is possible to accommodate the outside rind 2*b* of the ground wire 2 in the recesses 23*b*, 24*b* in the wrapping manner, as shown in FIG. 4B. Therefore, it is possible to prevent the outside rind 2*b* of the ground wire 2 from being torn or broken during the welding of the wires 1, 2. Accordingly, it is possible to hold the ground wire 2 securely and prevent the core line 2*a* of the ground wire 2 from being exposed, whereby the insulating effect can be enhanced. Additionally, since the ground wire 2 is welded in a manner that the resin tips 23, 24 envelop the leading end of the outside rind 2*b* of the wire 2, it is possible to enhance the waterproof capability of the wire 2 at the leading end.

[3$^{rd}$. embodiment]

Figure 5A:
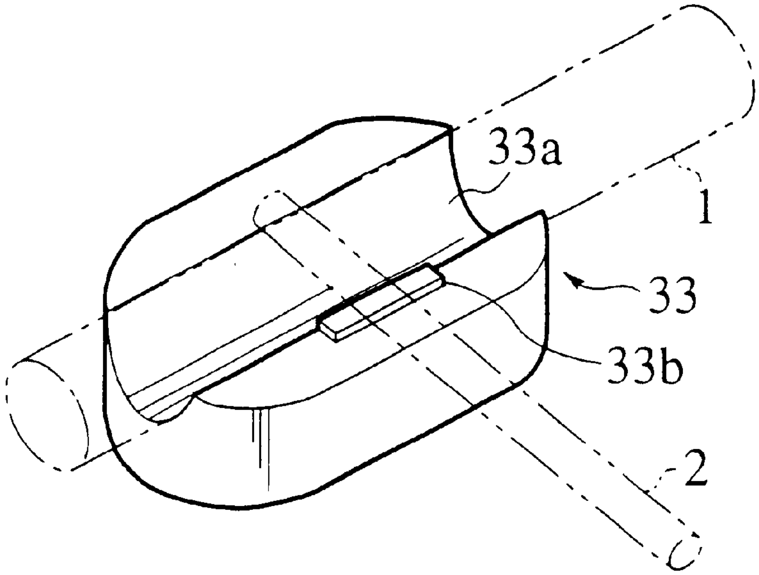
Figure 5B:
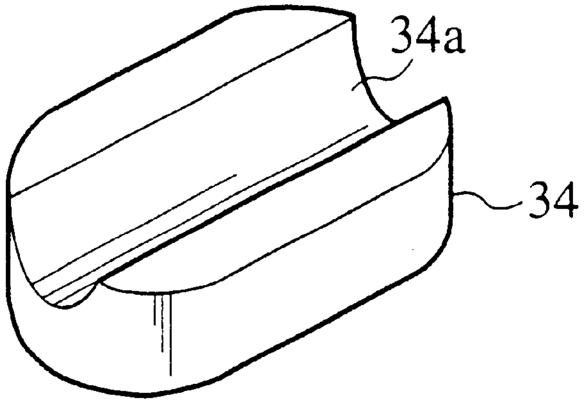

FIGS. 5A and 5B show resin tips constituting the connecting structure in accordance with the third embodiment of the present invention. FIG. 5A shows an upper resin tip 33 turned over, while FIG. 5B shows a lower resin tip 34.

The third embodiment is similar to the first embodiment in view that both of the resin tips 33, 34 are constituted by plate bodies each having a periphery of an elongated circle in its plan view and also provided, on respective butt faces thereof, with wire receiving grooves 33*a*, 34*a* each of which has a diameter corresponding to the diameter of the shield wire 1. The third embodiment differs from the first embodiment in view that the upper resin tip 33 is provided, on a part of the butt face contacting the ground wire 2, with a protrusion 33*b* for concentrating the ultrasonic energy. The protrusion 33*b* is shaped to have a configuration obtained by sticking a thin plate to the butt face of the resin tip 33. Further, the protrusion 33*b* is formed to have a width enough to press all of the core lines 2*a* in case of depressing the ground wire 2 in flat.

Figure 6A:
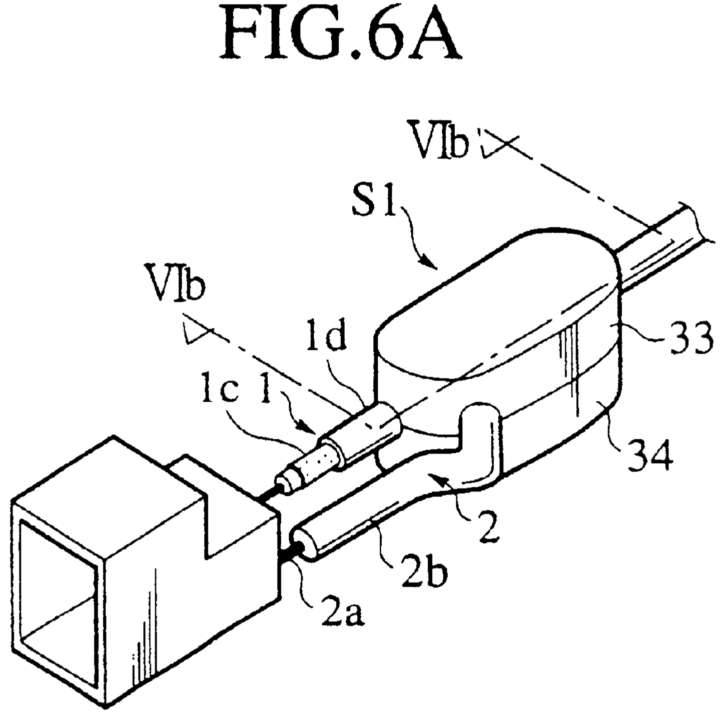
Figure 6B:
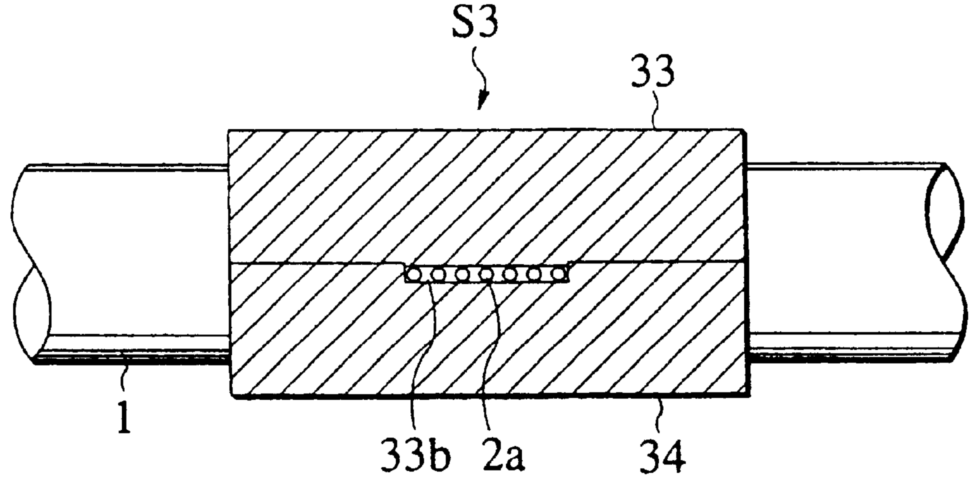

FIGS. 6A and 6B show a connecting structure S3 between the shield wire 1 and the ground wire 2, which is provided by using the abovementioned resin tips 33, 34. According to the shown structure S3, when applying the ultrasonic vibrations on the resin tips 33, 34 under condition that the overlapping portions of the shield wire 1 and the ground wire 2 are interposed between the resin tips 23, 24, it is possible to concentrate the ultrasonic energy on a part of the ground wire 2 in contact with the protrusion 33*b*, so that the outside rind 2*b* of the ground wire 2 can be molten initially and thereafter, the butt faces of the resin tips 33, 34 can be welded to each other. Thus, it is possible to weld the ground wire 2 to the shield wire 1 certainly, whereby the welding strength can be improved. Further, owing to the concentration of ultrasonic waves on the protrusion 33*b*, it is possible to reduce the energy loss, thereby allowing the welding period to be reduced.

In the modification of the above-mentioned embodiments, the connecting structure may be constituted by combining the press part of the first embodiment, the recess of the second embodiment and the protrusion of the third embodiment with each other selectively. Finally, it will be understood by those skilled in the art that the foregoing description is related to some preferred embodiments of the disclosed connecting structure, and that various changes and modifications may be made to the present invention without departing from the spirit and scope thereof.

What is claimed is:

1. A method of producing a connecting structure for covered wires, the method comprising the steps of:

preparing a first covered wire having a first conductor covered with a first resinous cover and a second covered wire having a second conductor covered with a second resinous cover;

overlaying the second covered wire on the first covered wire cross each other;

interposing respective overlapping portions of the first and second covered wires between an upper resin tip and a lower resin tip; and oscillating the upper and lower resin tips with ultrasonic waves while compressing the upper and lower resin tips from the outside, whereby the first and second resinous covers of the first and second covered wires are molten for removal thereby to bring the first conductor of the first covered wire into electrical contact with the second conductor of the second covered and simultaneously, the upper and lower resin tips are mutually welded to each other thereby to seal up the surroundings of a contact between the first conductor and the second conductor;

wherein each of the upper and lower resin tips is provided, on its butt face being abutted against the other resin, with a wire receiving groove which has a semi-circular cross section of a diameter corresponding to the diameter of the first covered wire.

2. A method as claimed in claim 1, wherein the first covered wire is a shield wire, while the second wire is a ground wire and wherein the first conductor is a shield conductor of the shield wire, while the second conductor is a core line of the ground wire.

3. A method as claimed in claim 1, wherein the upper resin tip is provided, at an intermediate portion of the wire receiving groove in the longitudinal direction, with a press part which serves to urge the second covered wire against the first covered wire and of which depth is smaller than the other portion of the wire receiving groove.

4. A method as claimed in claim 1, wherein each of the upper and lower resin tips is provided, on an outer edge of the butt face, with a recess for fitting the second resinous cover of the second covered wire.

5. A method as claimed in claim 1, wherein the upper resin tip is provided, on a part of the butt face contacting the second covered wire, with a protrusion for concentrating an ultrasonic energy in oscillating the upper and lower resin tips with ultrasonic waves.

* * * * *